(12) United States Patent
Teglia et al.

(10) Patent No.: US 8,135,129 B2
(45) Date of Patent: Mar. 13, 2012

(54) PROTECTION OF A MODULAR EXPONENTIATION CALCULATION PERFORMED BY AN INTEGRATED CIRCUIT

(75) Inventors: Yannick Teglia, Marseilles (FR); Pierre-Yvan Liardet, Peynier (FR); Alain Pomet, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 452 days.

(21) Appl. No.: 11/917,347

(22) PCT Filed: Jun. 14, 2006
(Under 37 CFR 1.47)

(86) PCT No.: PCT/FR2006/050562
§ 371 (c)(1),
(2), (4) Date: Dec. 18, 2009

(87) PCT Pub. No.: WO2006/134306
PCT Pub. Date: Dec. 21, 2006

(65) Prior Publication Data
US 2010/0208883 A1 Aug. 19, 2010

(30) Foreign Application Priority Data
Jun. 16, 2005 (FR) ...................................... 05 51649

(51) Int. Cl.
*H04L 9/28* (2006.01)
*G06F 12/14* (2006.01)
*H04L 9/32* (2006.01)
(52) U.S. Cl. ............ 380/28; 380/44; 380/277; 380/285; 713/159; 713/161; 713/165; 713/171; 713/172; 713/185; 713/187; 713/189; 713/191; 713/193; 713/194; 726/2; 726/6; 726/9; 726/20; 726/30; 726/34

(58) Field of Classification Search ............. 380/28, 380/277; 726/22, 26, 36; 713/171, 172, 713/193, 194
See application file for complete search history.

(56) References Cited

U.S. PATENT DOCUMENTS

| | | | | |
|---|---|---|---|---|
| 5,991,415 | A | * | 11/1999 | Shamir ......................... 380/30 |
| 6,064,740 | A | * | 5/2000 | Curiger et al. ................ 380/265 |
| 6,298,135 | B1 | * | 10/2001 | Messerges et al. ............... 380/1 |

(Continued)

OTHER PUBLICATIONS

Written Opinion from International Patent Application No. PCT/FR2006/050562.

(Continued)

*Primary Examiner* — Edan Orgad
*Assistant Examiner* — Jenise Jackson
(74) *Attorney, Agent, or Firm* — Wolf, Greenfield & Sacks, P.C.

(57) ABSTRACT

A method and a circuit for protecting a numerical quantity contained in an integrated circuit on a first number of bits, in a modular exponentiation computing of a data by the numerical quantity, including: selecting at least one second number included between the unit and said first number minus two; dividing the numerical quantity into at least two parts, a first part including, from the bit of rank null, a number of bits equal to the second number, a second part including the remaining bits; for each part of the quantity, computing a first modular exponentiation of said data by the part concerned and a second modular exponentiation of the result of the first by the FIG. 2 exponentiated to the power of the rank of the first bit of the part concerned; and computing the product of the results of the first and second modular exponentiations.

18 Claims, 2 Drawing Sheets

U.S. PATENT DOCUMENTS

| | | | |
|---|---|---|---|
| 6,973,190 | B1 | 12/2005 | Goubin |
| 7,248,700 | B2 * | 7/2007 | Seifert et al. ............... 380/282 |
| 2002/0186846 | A1 * | 12/2002 | Nyberg et al. ................ 380/273 |
| 2003/0044014 | A1 * | 3/2003 | Liardet et al. ................ 380/268 |
| 2003/0053621 | A1 * | 3/2003 | Benoit ............................ 380/28 |
| 2004/0125950 | A1 * | 7/2004 | Yen et al. ........................ 380/30 |
| 2005/0283514 | A1 * | 12/2005 | McIvor et al. ................. 708/491 |
| 2006/0023878 | A1 * | 2/2006 | Son ................................. 380/28 |
| 2006/0034454 | A1 * | 2/2006 | Damgaard et al. ............. 380/28 |
| 2006/0034457 | A1 * | 2/2006 | Damgaard et al. ............. 380/44 |
| 2006/0083370 | A1 * | 4/2006 | Hwang ........................... 380/28 |
| 2008/0025502 | A1 * | 1/2008 | Kounavis et al. ............... 380/30 |
| 2008/0104400 | A1 * | 5/2008 | Kocher et al. ................. 713/172 |
| 2009/0262943 | A1 * | 10/2009 | Damgaard et al. ............ 380/284 |

OTHER PUBLICATIONS

International Search Report from corresponding International Application No. PCT/FR2006/050562.

Comba, P.G., *Exponentiation Cryptosystems on the IBM PC*, IBM Systems Journal, IBM Corp. Armonk, New York, vol. 29, No. 4, Jan. 1990, pp. 526-538, XP000265347.

* cited by examiner

PROTECTION OF A MODULAR EXPONENTIATION CALCULATION PERFORMED BY AN INTEGRATED CIRCUIT

BACKGROUND OF THE INVENTION

1. Field of the Invention

The present invention generally relates to electronic circuits and, more specifically, to the protection of data contained in an integrated circuit against an extraction thereof, after an analysis of the circuit power consumption during calculations involving the data. The present invention more specifically relates to the protection of modular exponentiation algorithms. Such algorithms are used, for example, in smart cards or secure components for ciphering, signing, or putting in common data by means of a secret quantity of the chip, for example, in a DSA, RSA, or Diffie-Hellman algorithm).

2. Discussion of the Related Art

FIG. 1 is a schematic block diagram of a simplified architecture of an integrated circuit 1, for example, of a smart card, of the type to which the present invention applies. Circuit 1 comprises a central processing unit 11 (CPU) associated with one or several memories 12 (MEM) among which generally at least one element of non-volatile storage of a secret digital quantity (for example, a confidential code), and an input/output circuit 13 (I/O) enabling data exchange with the outside of circuit 1. The different elements communicate over one or several internal data, address, and control buses 14. Most often, several memories 12 among which at least one RAM and one non-volatile program storage memory are provided in the circuit.

Among possible attacks performed by persons attempting to fraudulently obtain confidential data from chip 1, the present invention applies to so-called simple or differential power analysis attacks (SPA or DPA). Such attacks comprise the measurement of the power consumption of the integrated circuit during the execution of algorithms handling keys or "secret" quantities that the hacker attempts to discover, this power consumption being different according to the respective states of the bits of the involved data. Power analysis attacks are based on the exploitation of results provided by the chip based on assumptions made on the different bits of the key. Such attacks are generally iterative to successively discover the different bits of a secret quantity.

FIG. 2 shows, in the form of a simplified flowchart, a conventional example of implementation of a modular exponentiation calculation modulo number P, where P is a number over p bits, comprising, based on a message M over any number of bits (coded over at most p bits) and on a secret quantity d over n bits (n being any number), the calculating of result $R_0=M^d$ mod P (block 20).

To perform this calculation, it is necessary to transit through intermediary results calculated by successive multiplications. It is spoken of a square-multiply method. In the shown example, a single register containing result R is used.

A quantity $R_n$ contained in a single register is initialized (block 21, $R_n=1$) as being equal to unity. The same register will contain, at the end of an algorithm, final result $R_0$. A counter i is then initialized as being equal to n−1 (block 22). The index i of the counter corresponds to the successive ranks of the n bits of secret quantity d, which may be written as:

$$d = \sum_{i=0}^{n-1} d_i 2^i.$$

The initialization of index counter i amounts to initializing a loop down to i=0 (block 23), within which successive multiplications will be performed according to the state of current bit $d_i$ of quantity d.

In a first step (block 24) of the loop, an intermediary result $R_i$ is calculated by squaring up (multiplying by itself) the content of the single register modulo P. Intermediary result $R_i=(R_{i+1})^2$ mod P replace the value contained in the result register.

Then, a test (block 25, $d_i=1$ ?) of the state of the current bit of quantity d (exponent of the exponentiation) is performed. If this state is 1 (output Y of block 25), the result of the preceding operation is multiplied by message M modulo P (block 26, $R_i=R_i*M$ mod P). The result of this second multiplication is always stored in the same register. If bit $d_i$ is at state zero (output N of block 25), the operation of block 26 is not executed.

As long as the loop has not ended (output N of block 23), counter i is decremented (block 27, i=i−1) and it is returned to the input of block 24.

At the end of the loop (output Y of block 23), the result register contains quantity $R_0$.

A disadvantage of the method of FIG. 2 is that the circuit power consumption depends on the execution or not of step 26. Now, this execution of step 26 directly depends on the current bit of the quantity meant to remain secret. Accordingly, such an implementation of a modular exponentiation algorithm is particularly vulnerable.

SUMMARY OF THE INVENTION

The present invention aims at overcoming all or part of the disadvantages of integrated circuits handling quantities considered as confidential in modular exponentiation calculations.

The present invention more specifically aims at protecting the quantities considered as confidential against possible frauds by analysis of the power consumption of the integrated circuit executing a modular exponentiation algorithm taking the confidential quantity as an exponent.

To achieve all or part of these objects, as well as others, the present invention provides a method for protecting a digital quantity contained in an integrated circuit over a first number of bits, in a calculation of modular exponentiation of data by said digital quantity, comprising:

selecting at least a second number ranging between unity and the first number minus two;

dividing the digital quantity into at least two portions, a first portion comprising, from the bit of rank zero, a number of bits equal to the second number, a second portion comprising the remaining bits;

for each portion of the quantity, calculating a first modular exponentiation of the data by the concerned portion and a second modular exponentiation of the result of the first one by number 2 raised to the power of the rank of the first bit of the concerned portion; and calculating the product of the results of the second modular exponentiations.

According to an embodiment of the present invention, the second number is selected randomly.

According to an embodiment of the present invention, a new random selection is performed on each new execution of the algorithm.

According to an embodiment of the present invention, the two modular exponentiations are inverted.

According to an embodiment of the present invention, the second portion is divided into at least two portions based on at least a third number, preferably selected randomly, between the second number plus one and said first number minus two, the steps of calculation of the first and second modular exponentiations and of the product of the results of the second modular exponentiations being applied to each of the portions.

According to an embodiment of the present invention, k increasing numbers $j_x$ are selected between unity and said first number minus two, the modular exponentiation calculation of the data noted M by the quantity noted d being obtained by the application of the following formula:

$$M^d = \prod_{x=1}^{k}\left((M^{d_x})^{2^{j_x}}\right) \bmod P \text{ or } M^d = \prod_{x=1}^{k}\left((M^{2^{j_x}})^{d_x}\right) \bmod P,$$

$$\text{with } d_x = \sum_{i=j_x}^{j_x+1} d_i 2^i,$$

where x designates the rank of number $j_x$ in the k increasing numbers, with $j_0=0$ and $j_k=n-1$ where n represents the first number, $d_x$ designates the portion of rank x of said quantity, P designates the modulo, and $d_i$ designates the bit of rank i of the quantity.

According to an embodiment of the present invention, the calculation is comprised in an algorithm selected from among the DSA, RSA, and Diffie-Hellman algorithms.

The present invention also provides an integrated circuit.

The present invention also provides a smart card.

BRIEF DESCRIPTION OF THE DRAWINGS

The foregoing and other objects, features, and advantages of the present invention will be discussed in detail in the following non-limiting description of specific embodiments in connection with the accompanying drawings.

DETAILED DESCRIPTION

Figure 1:
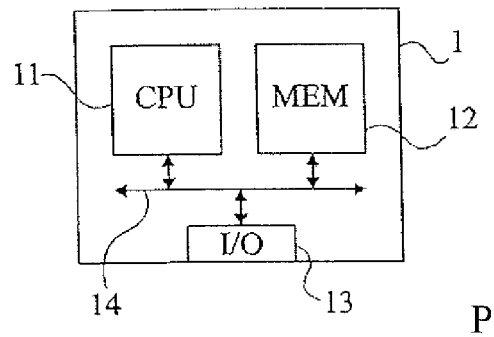
FIG. 1, previously described, very schematically and partially shows in the form of blocks an example of an integrated circuit of the type to which the present invention applies.

For clarity, only those method steps and circuit elements which are useful to the understanding of the present invention have been shown in the drawings and will be described hereafter. In particular, the details constitutive of the central processing unit and especially the operators used to calculate a modular exponentiation have not been discussed in detail, the present invention being compatible with any conventional microprocessor exploiting stored data. Further, the exploitation that is made upstream or downstream of the modular exponentiation algorithm processed by the present invention, of the message, and/or of the secret quantities has not been described in detail, the present invention being here again compatible with any conventional modular exponentiation algorithm.

A feature of an embodiment of the present invention is to divide the calculation of the modular exponentiation into several calculations on portions of the secret quantity (any digital quantity). In other words, the invention provides dividing the secret quantity into several portions and applying these portions to successive modular exponentiation steps.

Another feature of an embodiment of the present invention is to randomly select the bit ranges of the secret quantities, preferably, by changing the secret quantity portions on each new execution of the modular exponentiation.

Figure 3:
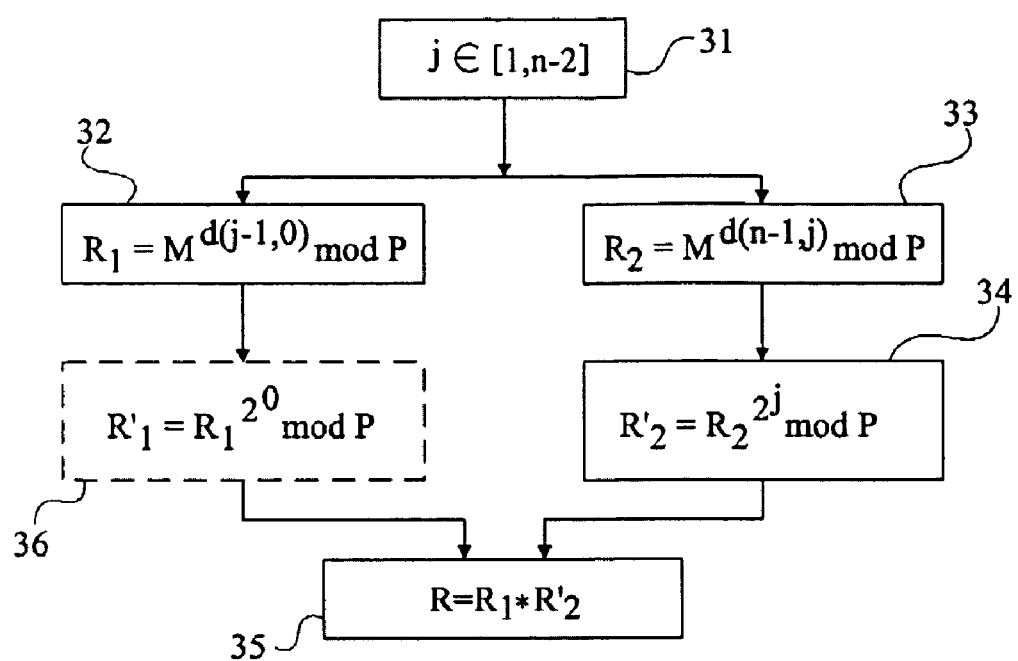
FIG. 3 is a flowchart of an embodiment of the modular exponentiation calculation method according to the present invention.

FIG. 3 is a simplified flowchart of steps of an implementation mode of a modular exponentiation calculation according to the present invention.

In FIG. 3, it is assumed that the calculation of the modular exponentiation is divided into two portions of a digital quantity representing, for example, a secret quantity.

It is started (block 31, FIG. 3) by randomly selecting a number j ranging between 1 and n−2. As previously, n designates the number of bits of secret quantity d that may be written as:

$$d = \sum_{i=0}^{n-1} d_i 2^i.$$

Number j is used to divide secret quantity d into two portions. A first portion d(j−1,0) contains the bits of ranks 0 to j−1 of quantity d. A second portion d(j,n−1) contains the bits of rank j to n−1.

Figure 2:
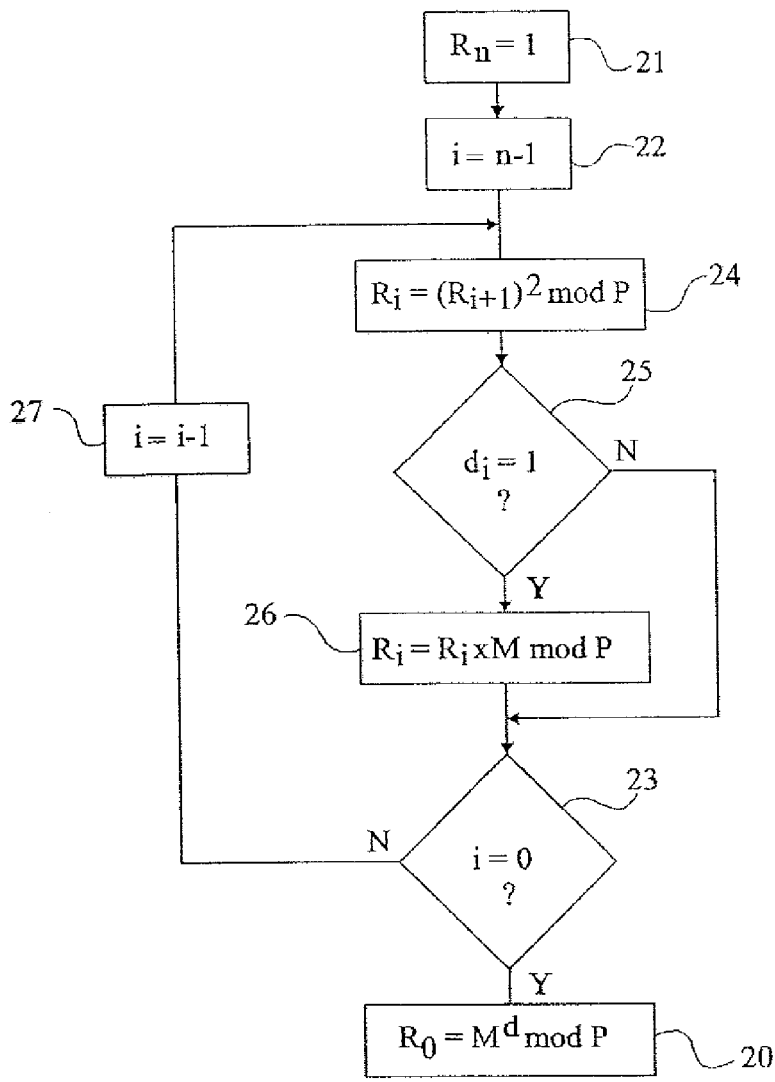
FIG. 2 is a flowchart showing the conventional steps of a modular exponentiation calculation.

A first modular exponentiation of message M by first portion d(j−1,0) of the secret quantity, modulo P, is calculated (block 32, $R1=M^{d(j-1,0)}$ mod P. The same notations as those defined previously are used, that is, P represents a number over p bits and M the data message to be submitted to the modular exponentiation by secret quantity d, M being coded over at most p bits. The calculation of first result R1 is performed, for example, by the implementation of a conventional method of the type illustrated in FIG. 2.

Message M is, in parallel or successively, submitted (block 33, $R2=M^d(n-1,j)$ mod P) to another modular exponentiation calculation by second portion d(n−1, j) of the secret quantity. A second intermediary result R2 stored, for example, in a register separate from result R1, is obtained. This second modular exponentiation is, for example, also performed by implementing a conventional algorithm of the type discussed in relation with FIG. 2.

Then (block 34, $R2'=R2^{2^j}$ mod P), at least result R2 of the second modular exponentiation is raised to power $2^j$, modulo P and result R2' is stored, for example, in a third register. This step corresponds to a third modular exponentiation of value R2 by $2^j$, here performed conventionally.

Finally, the final result of the modular exponentiation is obtained by multiplying the first and third intermediary results (block 35, $R=R1*R2'=M^d$ mod P).

In FIG. 3, an additional step 36 ($R1'=R1^{2^{j'}}$ mod P) has been shown in dotted lines. This step maintains result R1 but can enable improving the masking of the execution.

Taking as an example the modular exponentiation of number 3 (M=3) by exponent 10 (d=10) over 4 bits with a modulo 11, the intermediary results obtained for j=2 are the following:

d(1,0)=10=2 and d(3,2)=10=2 (over 4 bits, 10 is written as 1010);

R1=$3^2$ mod 11;

R2=$3^2$ mod 11;

R2'=$(3^2)^4$ mod 11, that is, R2'=$3^8$ mod 11=5.

Final result R can be written as:

R=$3^2 * 3^8$ mod 11=9*5 mod 11=1, or:

R=$3^{2+8}$ mod 11=$3^{10}$ mod 11=1.

As a variation, steps 33 and 34 are inverted, that is, the second intermediary result is a modular exponentiation of message M by $2^j$, the third intermediary result being a modular exponentiation of the second result by the second portion d(n−1, j) of the key.

Preferably, number j is changed on each modular exponentiation calculation. This prevents a possible hacker from being able to discover secret quantity d by an iterative power analysis of the integrated circuit since the portions of the processed secret quantity change each time.

As compared with a conventional modular exponentiation execution, the present invention uses using additional registers to store the intermediary results. The number of additional registers is at least one to store the first modular exponentiation result R1 while waiting for the second and third intermediary results to be calculated. Third result R2' may reuse the register having stored second result R2.

According to another embodiment, quantity d is divided into more than two portions. This amounts to considering k increasing numbers $j_x$ (x ranging between 1 and k) with k greater than or equal to 3, $j_i=0$ and $j_k=n-1$, so that quantity d can be expressed as:

$$d = \sum_{x=1}^{k} d_x \text{ with } d_x = \sum_{i=j_x}^{j_{x+1}} d_i 2^i, \text{ where}$$

$$d = \sum_{x=1}^{k} \left( \sum_{i=j_x}^{j_{x+1}} d_i 2^i \right).$$

The implementation of the method of the present invention can then be expressed as:

$$M^d = \prod_{x=1}^{k} \left( (M^{d_x})^{2^{j_x}} \right) \bmod P, \text{ or}$$

$$M^d = \prod_{x=1}^{k} \left( (M^{2^{j_x}})^{d_x} \right) \bmod P.$$

Of course, the present invention is likely to have various alterations, improvements, and modifications which will readily occur to those skilled in the art. In particular, the practical implementation of the present invention is within the abilities of those skilled in the art based on the functional description given hereabove by using tools conventional per se.

Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A method for protecting a digital quantity contained in an integrated circuit over a first number of bits, in a calculation of modular exponentiation of data by said digital quantity, comprising:

selecting, by the integrated circuit, at least a second number ranging between unity and the first number minus two;

dividing, by the integrated circuit, the digital quantity into at least two portions, a first portion comprising, from the bit of rank zero, a number of bits equal to the second number, and a second portion comprising the remaining bits;

calculating, by the integrated circuit, a first modular exponentiation of the data by the first portion of the digital quantity to provide a first result;

calculating, by the integrated circuit, a first modular exponentiation of the data by the second portion of the digital quantity to provide a second result;

calculating, by the integrated circuit, a second modular exponentiation of the second result by two raised to the power of the second number to provide a third result; and calculating, by the integrated circuit., the product of the first and third results of the modular exponentiations.

2. The method of claim 1, wherein the second number is selected randomly.

3. The method of claim 2, wherein a new random selection is performed on each new execution of the algorithm.

4. The method of claim 1, wherein the two modular exponentiations are inverted.

5. The method of claim 1, wherein the second portion is divided into at least two portions based on at least a third number, preferably selected randomly, between the second number plus one and the first number minus two, the steps of calculation of the first and second modular exponentiations and of the product of the results of the second modular exponentiations being applied to each of the portions.

6. The method of claim 1, wherein k increasing numbers $j_x$ are selected between unity and the first number minus two, the modular exponentiation calculation of the data noted M by the quantity noted d being obtained by the application of the following formula:

$$M^d = \prod_{x=1}^{k} \left( (M^{d_x})^{2^{j_x}} \right) \bmod P \text{ or } M^d = \prod_{x=1}^{k} \left( (M^{2^{j_x}})^{d_x} \right) \bmod P,$$

$$\text{with } d_x = \sum_{i=j_x}^{j_{x+1}} d_i 2^i,$$

where x designates the rank of number $j_x$ in said k increasing numbers, with $j_0=0$ and $j_k=n-1$ where n represents said first number, $d_x$ designates the portion of rank x of said quantity, P designates the modulo, and $d_i$ designates the bit of rank i of said quantity.

7. The method of claim 1, implemented using an algorithm selected from among the DSA, RSA, and Diffie-Hellman algorithms.

8. An integrated circuit comprising at least a central processing unit, a memory, and an input/output circuit, comprising circuitry for implementing the method of claim 1.

9. A smart card, comprising the integrated circuit of claim 8.

10. A method for protecting a digital quantity contained in an integrated circuit, the digital quantity having a first number of bits, in a modular exponentiation of data by the digital quantity, comprising:
- selecting, by the integrated circuit, a second number in a range between unity and the first number minus two;
- partitioning, by the integrated circuit, the digital quantity into a first portion comprising the second number of bits of the digital quantity and a second portion comprising remaining bits of the digital quantity;
- calculating, by the integrated circuit, a first modular exponentiation of the data by the first portion of the digital quantity to provide a first result;
- calculating, by the integrated circuit, a first modular exponentiation of the data by the second portion of the digital quantity to provide a second result;
- calculating, by the integrated circuit, a second modular exponentiation of the second result by two raised to the power of the second number to provide a third result; and
- calculating, by the integrated circuit, a product of the first and third results to provide a modular exponentiation of the data by the digital quantity.

11. The method of claim 10, wherein the second number is selected randomly.

12. The method of claim 10, wherein a new second number is selected randomly on each new execution of the modular exponentiation.

13. The method of claim 10, wherein the first and second modular exponentiations are inverted.

14. The method of claim 10, further comprising calculating a second modular exponentiation of the first result by two raised to the power of zero.

15. The method of claim 10, wherein the digital quantity is partitioned into three or more portions, a first modular exponentiation of the data by each of the portions of the digital quantity is calculated, and the product of each of the results is calculated.

16. The method of claim 10, wherein k increasing numbers $j_x$ are selected between unity and the first number minus two, the modular exponentiation calculation of the data M by the quantity d being obtained by the application of the following formula:

$$M^d = \prod_{x=1}^{k} \left((M^{d_x})^{2^{j_x}}\right) \bmod P \text{ or } M^d = \prod_{x=1}^{k} \left((M^{2^{j_x}})^{d_x}\right) \bmod P,$$

with $d_x = \sum_{i=j_x}^{j_{x+1}} d_i 2^i$, where x designates the rank of number $j_x$ in said k increasing numbers, with $j_0=0$ and $j_k=n-1$ where n represents said first number, $d_x$ designates the portion of rank x of said quantity, P designates the modulo, and $d_i$ designates the bit of rank i of said quantity.

17. The method of claim 10, wherein the first portion includes the bits of rank zero to j−1 of the digital quantity and the second portion contains the bits of rank j to n−1 of the digital quantity, wherein n is the first number and j is the second number.

18. An integrated circuit comprising:
- a central processing unit;
- a memory; and
- an input/output circuit, wherein the memory is encoded with instructions that, when executed by the central processing unit, perform a method for protecting a digital quantity contained in the integrated circuit, the digital quantity having a first number of bits, in a modular exponentiation of data by the digital quantity, the method comprising:
- selecting, by the integrated circuit, a second number in a range between unity and the first number minus two;
- partitioning, by the integrated circuit, the digital quantity into a first portion comprising the second number of bits of the digital quantity and a second portion comprising remaining bits of the digital quantity;
- calculating, by the integrated circuit, a first modular exponentiation of the data by the first portion of the digital quantity to provide a first result;
- calculating, by the integrated circuit, a first modular exponentiation of the data by the second portion of the digital quantity to provide a second result;
- calculating, by the integrated circuit, a second modular exponentiation of the second result by two raised to the power of the second number to provide a third result; and
- calculating, by the integrated circuit, a product of the first and third results to provide a modular exponentiation of the data by the digital quantity.

* * * * *